United States Patent [19]

Alamaro

[11] Patent Number: 4,505,795
[45] Date of Patent: Mar. 19, 1985

[54] PLASMA METHOD AND APPARATUS FOR THE PRODUCTION OF COMPOUNDS FROM GAS MIXTURES, PARTICULARLY USEFUL FOR THE PRODUCTION OF NITRIC OXIDES FROM ATMOSPHERIC AIR

[76] Inventor: Moshe Alamaro, 73 Herzl St., Hod Hasharon, Israel

[21] Appl. No.: 550,516

[22] Filed: Nov. 10, 1983

Related U.S. Application Data

[63] Continuation of Ser. No. 325,731, Nov. 30, 1981, abandoned.

[30] Foreign Application Priority Data

Dec. 3, 1980 [NO] Norway ................................ 803666

[51] Int. Cl.³ ............................................. C01B 21/30
[52] U.S. Cl. ..................................... 204/179; 204/178; 60/39.02; 60/39.07; 60/39.12; 60/673; 60/649; 310/11; 290/52; 422/186.21; 422/186.22
[58] Field of Search ............... 204/178, 179; 60/39.02, 60/39.07, 39.12, 673, 649; 310/11; 290/52; 422/186.26, 186.22

[56] References Cited

U.S. PATENT DOCUMENTS

| | | | |
|---|---|---|---|
| 3,169,914 | 2/1965 | Young et al. | 204/164 |
| 3,332,870 | 7/1967 | Orbach et al. | 204/179 X |
| 3,546,499 | 12/1970 | Somers | 310/11 |
| 3,622,812 | 11/1971 | Isaacson | 310/11 |
| 3,666,408 | 5/1972 | Grosse | 204/179 |
| 4,064,222 | 12/1977 | Bretz | 310/11 |

*Primary Examiner*—John F. Niebling
*Attorney, Agent, or Firm*—Benjamin J. Barish

[57] ABSTRACT

A process and apparatus for the production of compounds from gas mixture by the plasma method, particularly useful for the production of nitric oxides from atmospheric air as a step in producing synthetic nitrogenous fertilizer. According to the novel method, a supersonic speed is imparted to the gaseous medium flowing through the reactor in which an electrical discharge is produced, and at least part of the energy of the gaseous medium exiting from the reactor is converted into electrical energy.

22 Claims, 6 Drawing Figures

PLASMA METHOD AND APPARATUS FOR THE PRODUCTION OF COMPOUNDS FROM GAS MIXTURES, PARTICULARLY USEFUL FOR THE PRODUCTION OF NITRIC OXIDES FROM ATMOSPHERIC AIR

This application is a continuation of application Ser. No. 06/325,731, filed Nov. 30, 1981, abandoned.

BACKGROUND OF THE INVENTION

The present invention relates to a process and apparatus for the production of compounds from a gas or a gas mixture by the plasma method. The invention is particularly useful for reacting atmospheric nitrogen and oxygen to form nitric oxides, as a step in producing synthetic nitrogenous fertilizer, and the invention is therefore described below with respect to such an application.

The most economical and popular method today for fixing nitrogenous fertilizer is the Haber-Bosch process in which hydrogen is bonded with nitrogen under high pressure, and in the presence of catalyst, to form ammonia. However, this process requires vast quantities of fossil fuel, such as oil and natural gas, to provide the hydrogen. With the rapidly increasing cost and rapidly depleting supplies of fossil fuel, it is becoming increasingly important to find an alternative economical process for producing synthetic nitrogenous compounds.

Another method, known even before the Haber-Bosch process, is based on the plasma or arc-discharge technique and uses atmospheric nitrogen and oxygen to form nitric oxide. One technique for implementing this process is based on the Birkeland and Eyde furnace, which produces a fan-shaped arc stabilized by a constant magnetic field. Another technique is based on the Schönherr furnace, which stabilizes the arc by air turbulence, the air entering at the bottom through tangential openings and given a rapid spiral motion inside the arc zone. However, both furnaces require such large amounts of electrical power that they both became economically unfeasible and were replaced by the presently-used Haber-Bosch process.

BRIEF SUMMARY OF THE INVENTION

An object of the present invention is to provide an improved and economical method and apparatus for producing a compound from a gas, or mixture of gases, by the plasma method, and particularly for the reaction of nitrogen gas with oxygen gas by means of an electrical discharge or electrical arc to produce nitric oxide.

According to a broad aspect of the present invention, there are provided a process and apparatus for the formation of a compound from a gaseous medium, i.e., from a gas or mixture of gases, by the plasma method, in which an electrical discharge is effected in a reactor into which the gaseous medium is fed such as to cause a chemical reaction, characterized in that the gas flow is at supersonic speed within said reactor, and at least part of the energy of the gaseous medium exiting from the reactor is converted into electrical energy.

In the preferred embodiments of the invention described below, the gas mixture is introduced into the reactor at subsonic speed and is accelerated within the reactor to supersonic speed. In addition, the exiting mixture is rapidly cooled by expansion from supersonic speed to higher supersonic speed to prevent decomposition of the product produced in the reactor.

Further features and advantages of the invention will be apparent from the description below.

BRIEF DESCRIPTION OF THE DRAWINGS

The invention is more particularly described below with reference to the accompanying drawings, wherein.

THEORETICAL CONSIDERATIONS

Figure 1:
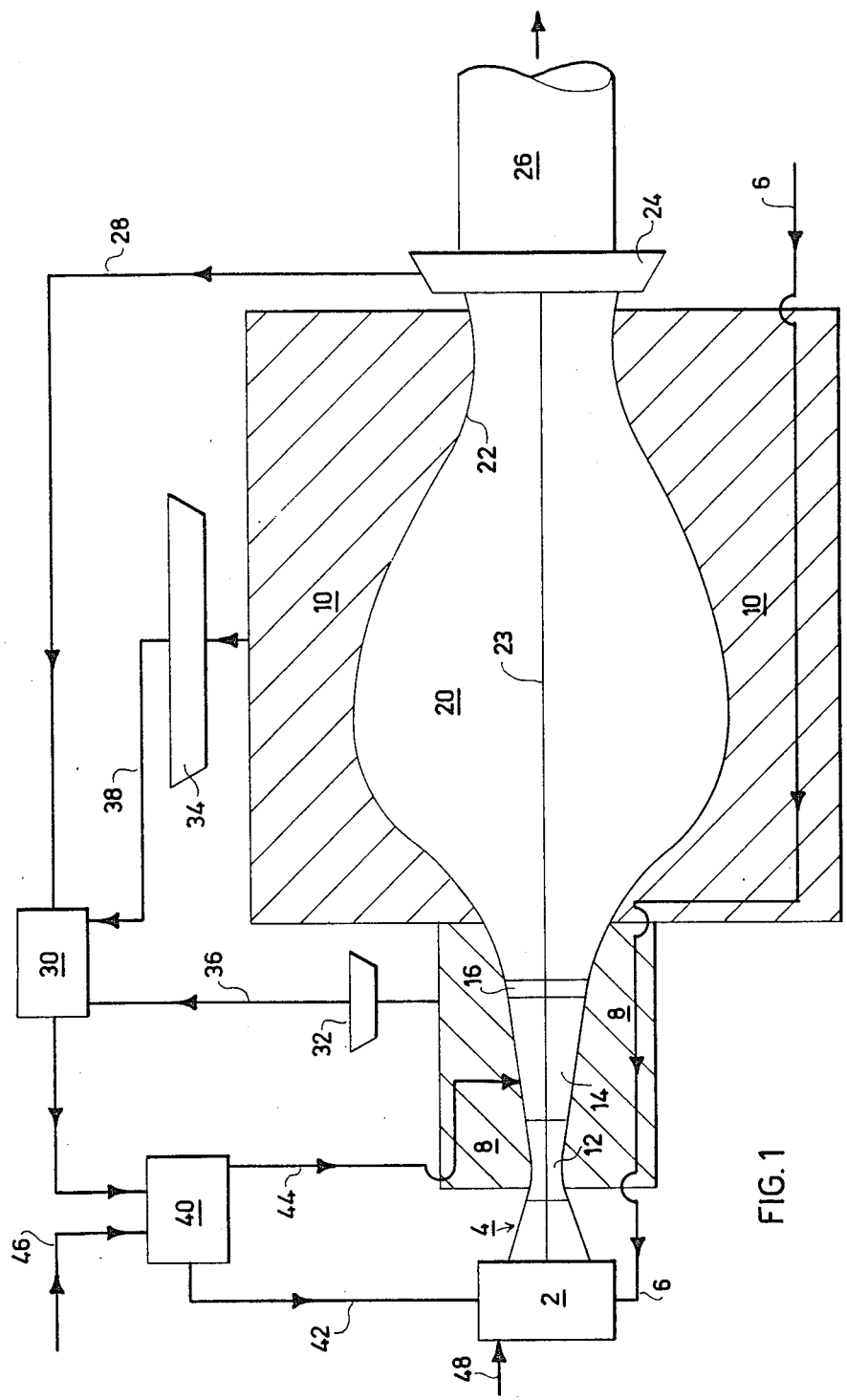
FIG. 1 is a diagram schematically illustrating one preferred implementation of the present invention.
Figure 2:
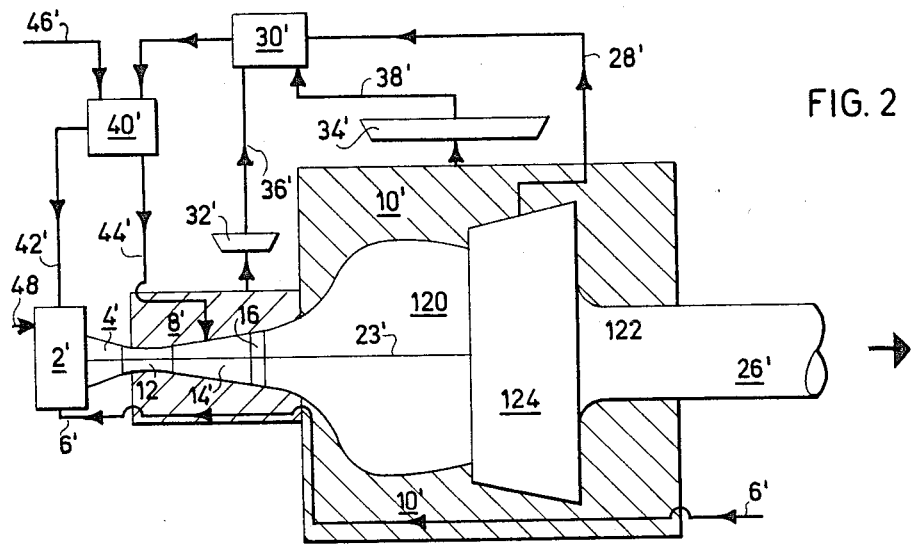
FIGS. 2 and 3 are diagrams similar to that of FIG. 1 but illustrating two further implementations.
Figure 3:
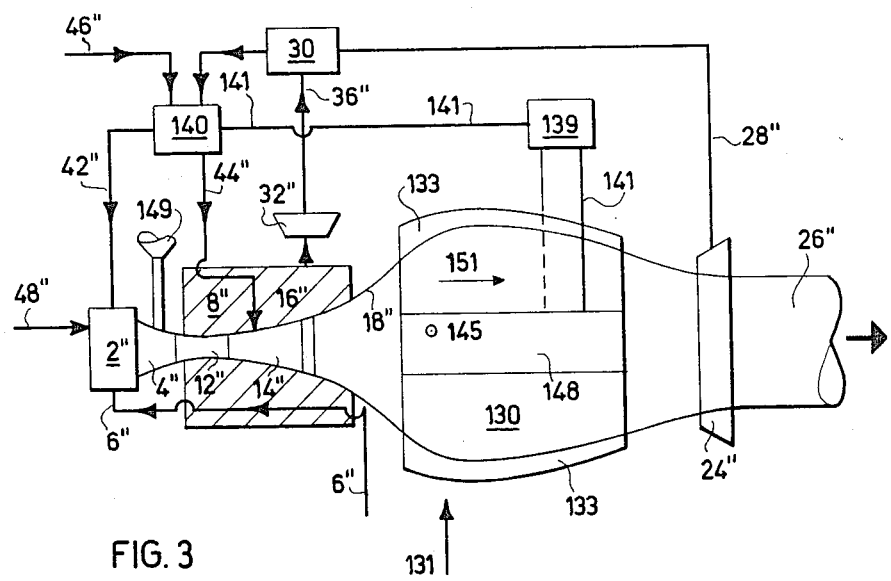

Before describing the implementations of the invention as illustrated in the diagrams of FIGS. 1, 2 and 3, it is believed that the following discussion of the thermodynamic considerations involved in the present invention will aid in understanding the advantages provided by the invention.

Electric energy is defined from the thermodynamic point of view as "free energy", which means that theoretically it can be converted to other forms of energy at an efficiency up to "1." However, chemical arc, or chemical plasma processes are generally characterized by low efficiency.

The present invention is based on a thermodynamic model which shows the conditions under which the energy efficiency of the chemical plasma methods would be significantly increased. Briefly, the required conditions are: applying supersonic speed to the gas, or to the mixture of gases, inside the discharge chamber; and recovering electrical energy using energy of the gas emitted from the reactor.

The invention is based on a thermodynamic analysis performed on two arc processes which were commercially operated in Norway. Both processes were for the production of nitric oxide as an intermediate for the production of nitrogenous compounds. The first process is the Birkeland & Eyde process (Birkeland Kr., "On the Oxidation of Atmospheric Nitrogen in Electric Arcs", *Trans. Fraday Soc.*, Vol. II, 98, 1906), in which the stabilizing of the discharge is done by applying a magnetic field on an A.C. arc; and the second process is the Schönherr process (Schönherr O., "Über die Fabrikation des Luftsalpeters nach dem Verfahren des Badischen Anilinund Sodafabrik", *Electro. Zeit.*, 16.365, 1909) in which the stabilizing of the discharge is done by increasing the turbulence of the air inside the arc zone, by swirling the air tangentially in addition to moving it axially. These two known processes are characterized by low efficiency, the efficiency being about 3% with a yield of 1.1-1.2 mol NO per Kwh. In addition, these known processes are characterized by low mass production rates per reactor, such that each production site requires many reactors.

The thermodynamic principles upon which the present invention is based also explain the reasons for the low mass production rates. Thus, it is herein shown that the problem of instability of an arc discharge is related to the problem of limited mass production rate if the flow inside the reactor is subsonic. The present invention produces an increase in the mass production rate, in addition to an increase of the energy efficiency, by applying supersonic speed to the gas flow within the reactor.

The invention is not limited to any one arc chemical process. However, the invention is particularly useful for the production of nitric oxide by forming an arc in flowing air, and is therefore described below with respect to this application.

The electric power invested in a chemical arc process is consumed by several mechanisms. First of all, the desired chemical product takes a part of the invested power whose ratio to the total power, denoted as X, represents the efficiency of the process; its value for NO production is about 0.03. The remainder of the power is lost by conduction through the walls of the reactor and by convection outside of the arc chamber.

Since the invention is related to a process in which the arc is produced in gases moving at very high velocities, it is assumed that the power conducted outside the chamber walls is negligible in comparison to the power convected by the flow. Eventually, "1−X" of the power invested in the arc is convected outside the arc.

The invention is particularly directed to the recovery of that energy. Mechanical work could be produced with an efficiency of $\eta_1$, so $(1-X)\cdot\eta_1$ is used to produce electric power. This amount of electricity could be re-cycled to the arc. It can be shown that now the power needed for the process is $1-(1-X)\cdot\eta_1$, so that the energy efficiency (X) may be multiplied by the factor $\alpha$ whose value is:

$$\alpha = \frac{1}{1-(1-X)\cdot\eta_1} \quad \text{(Eq. 1)}$$

The invention shows the conditions required for the Carnot efficiency $\eta_1$ to be a function of Mach Number inside the reactor. It will be shown that as the Mach Number is increased, the value of $\eta_1$ is accordingly increased, since $\alpha$ is a function of $\eta_1$. Thus, the greater the Mach Number is increased, the greater will the energy efficiency be increased.

The value of the maxiumum Carnot efficiency is defined by the second law of thermodynamics:

$$\eta_1 = \frac{T_{qi} - T_{sur}}{T_{qi}} = 1 - \frac{T_{sur}}{T_{qi}} \quad \text{(Eq. 2)}$$

wherein $T_{qi}$ is the temperature of the gas from which mechanical work is obtained, and $T_{sur}$ is the surrounding ambient temperature, taken for simplicity as 300° K.

An electric arc in air causes the ionization of the air, wherein the charged particles are accelerated by the electric and magnetic fields, resulting in heating of the air. Calculated chemical equilibrium shows that when the temperature of the air rises to 3500° K., it becomes a mixture including about 5.25% of NO (See Ammann, P. R. and Timmis, R. S., "Chemical Reactions during Rapid Quenching of Oxygen-Nitrogen Mixture from Very High Temperature", *A.I.Ch.E. Journal*, 956, Sept. 1966). Cooling this mixture should be done very rapidly in order to "freeze" this NO concentration achieved in the high temperature mixture. When the mixture is so cooled, decomposition of the nitric oxide is inhibited; if the temperature of the gas containing the nitric oxide has lowered sufficiently, it is found that the half-life time of the NO is large enough to permit further processing of the nitric oxides achieved by the arc.

Preferably, the quenching stage is done by an isentropic expansion. The expansion is done in order to lower the static temperature of the mixture. However, the value of $\eta_1$ is a function of the stagnation temperature of the mixture.

In this novel method, the stagnation temperature of the mixture is very high, while the static temperature inside the reactor is much lower. This is obtained by applying supersonic speed inside the reactor during heating by the arc.

For purposes of explanation, suppose there is a low subsonic speed inside the reactor. For that case, the stagnation temperature is equal to the static temperature. Assume the case in which the temperature inside the reactor is 3500° K. In that case, if the mixture is expanded from the subsonic flow to supersonic speed, and the static temperature is lowered rapidly, we find that the calculated value of $\alpha$ will be 8.84.

In apparatus operating according to the invention, the stagnation temperature inside the reactor is very high. This is achieved by applying supersonic speed during heating by the arc. The ratio between the stagnation temperature $T_{qi}$ to the static temperature $T_s$ is given by:

$$\frac{T_{qi}}{T_s} = 1 + \frac{\lambda - 1}{2} \cdot M^2 \quad \text{(Eq. 3)}$$

wherein:
$\lambda$ is the specific heat ratio;
and M is the Mach Number of the flow.

The preferred embodiments of the invention described below are characterized by expansion from supersonic speed to higher supersonic speed outside the arc chamber. It is essential that irreversibility will be minimized in all stages. In the ideal case, while all stages are isentropic and shock waves are prevented totally, we find that combining the above equations produces a result in which $\alpha$ is a function of Mach Number inside the reactor.

$$\alpha = \frac{1}{1-(1-X)\cdot\left[1 - \dfrac{300}{T_s\cdot\left(1 + \dfrac{\lambda-1}{2}\cdot M^2\right)}\right]} \quad \text{(Eq. 4)}$$

The value of the total efficiency:

$$\eta = \alpha \cdot X \quad \text{(Eq. 5)}$$

If we use, for calculation purposes, the case of nitric oxide production, $X \approx 0.03$, $T_s = 3500°$ K., and $\lambda \approx 1.4$, the ideal efficiency according to this invention will be:

| M   | λ     | η     | (ideal efficiency) |
|-----|-------|-------|--------------------|
| 1.5 | 11.45 | 0.343 |                    |
| 2.0 | 13.13 | 0.394 |                    |
| 2.5 | 14.94 | 0.448 |                    |
| 3.0 | 16.75 | 0.503 |                    |
| 3.5 | 18.48 | 0.554 |                    |
| 4.0 | 20.08 | 0.602 |                    |
| 4.5 | 21.52 | 0.646 |                    |
| 5.0 | 22.80 | 0.663 |                    |
| 5.5 | 23.93 | 0.718 |                    |
| .   | .     | .     |                    |
| .   | .     | .     |                    |
| .   | .     | .     |                    |

The general equation for any arc chemical process is based on the last two equations, which show that the energy efficiency depends on the extent of the supersonic Mach Number inside the reactor.

Figure 4:
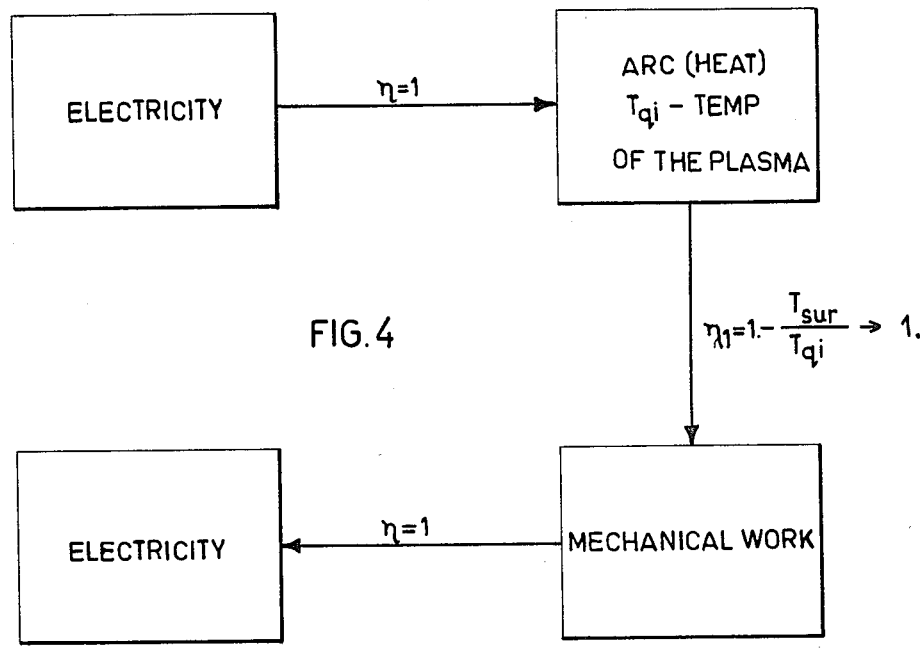
FIGS. 4-6 are diagrams provided to aid in understanding the principles of the present invention.

What has been described above in detail may be summarized by the diagram of FIG. 4, wherein:

$T_{sur}$ = temperature of the surrounding
$T_{qi}$ = stagnation temperature during heating by the arc
$\eta$ = the theoretical efficiency in transforming one form of energy to another.

Electricity, which is defined thermodynamically as "free energy", is invested in the arc. The stagnation temperature of an arc could be very high, much higher than any combustion process, for example. In the proposed process, increase in entropy should be minimized. If all of these conditions are kept, we find that:

$$\eta_1 = 1 - \frac{300}{T_{qi}} \rightarrow 1 \quad \text{(Eq. 6)}$$

The value of $\alpha$ will be, in the case of nitric oxide production:

$$\alpha \cong \frac{1}{1 - 0.97 \cdot \eta_1} \quad \text{(Eq. 7)}$$

The second aspect of the invention concerns the limit in the mass production rate of the arc chemical process. It is herein shown that the above-proposed method, of using supersonic velocities inside the reactor, may increase mass production rates. The analysis given below is related to the role of compressible flow with energy exchange called "Rayleigh Flow" (see, for example, Streeter, V. L., "Handbook of Fluid Dynamics", Chapter 8.38, McGraw-Hill Company, 1961, and Shapiro, A. H., "The Dynamic and Thermodynamics of Compressible Fluid Flow", The Ronald Press Company, N.Y., 1953).

The analysis combines explanations of the relation of arc instability and the "thermal choking" of subsonic flow, to the limit of mass production rate of arc chemical process. This limit is related to any arc chemical process; however, the analysis given below is described particularly for the case of nitric oxide production.

Typical characteristics of V - I (Voltage vs Current) of an arc show that an arc has "negative" resistance. This means that the dynamic resistance of an arc is negative. Thus, while an increased amplitude takes place in the current of the discharge, the voltage drops. From the literature of plasma physics, (see, for example, Cobine, J. D., "Gaseous Conductors", Dover Publications, N.Y., 1958) it is explained that when the P·R of the discharge (P=pressure, R=radius of the plasma chamber) is increased, or the current of the discharge is increased, or all these parameters are increased, we find that the negative resistance of an arc causes it to be "unstable". Also, if at least one of these parameters I, P·R (current, pressure-radius) is increased, the arc tends to be constricted to filaments or "streamers", and instead of the discharge taking place in the complete volume of the plasma chamber, it takes place only in parts of the chamber.

The most common method of stabilizing a discharge is by connecting a resistor ballast in series to the discharge. According to the stability criterion, the negative slope of the resistor should exceed the slope of the arc at the point of intersection. However, this solution of connecting a resistor ballast to an arc is not practical for high power arc chemical process. Birkeland noted in his paper that in early attempts made by Lord Rayleigh at the end of the 19th century, 75% of the total power supplied by the power supply was consumed by this resistor.

Birkeland's method for nitric oxide production is based on stabilizing the arc by applying a magnetic field to an A.C. arc. However, in the mentioned Schönherr process, which was also operated in Norway, another method of stabilization was used. In this process the air is blown through a long pipe in which the arc is produced, and the stabilization is effected by increasing the turbulence of the air, namely, by swirling it tangentially. As we see from this example, increasing the turbulence in the plasma chamber could replace the need for a magnetic field. Eventually, the role of flow and turbulence is quite essential in stabilizing an arc discharge and in delaying its constriction and instability to higher values or P·R.

The following example is presented to support the argument that there is such a limit in the mass production rate:

A nitric oxide arc process takes place in a reactor, the cross section (A) of which is 1 cm$^2$. The air at the entrance to the reactor is under standard conditions while its velocity (V) is 50 m/sec. The nitric oxide concentration [NO] achieved by the process is 3%.

The mass production rate of [NO] would be:

$$\dot{m} = \rho \cdot A \cdot V \cdot [NO]$$

wherein:
A = 1 cm$^2$
V = 5·10$^3$ cm/sec
$\rho$ = 1.25·10$^{-3}$ gram/cm$^3$
The mass production rate is:

$\dot{m} = 5 \cdot 10^3 \cdot 1.25 \cdot 10^3 \cdot 0.03 = 0.0187$ gram/sec of
NO = 0.315 Kg of fixed nitrogen per hour It can be seen from this example that the mass production is low. Since $\dot{m} = \rho \cdot A \cdot V$, it would seem that one must increase the density of the gas, and increase the cross-sectional area of the reactor, to further increase the mass rate of air. As it has been shown, there is a limit to the possible increase of P·R of a discharge due to the phenomenon of instability. Since the density is proportional to the pressure, and the cross-sectional area is proportional to the square of the radius, we find that in order to increase $\rho \cdot A$, the P·R should also be increased. It can be seen from this qualitative example how the point of mass rate is directly related to the instability.

It is believed that these limitations can be avoided by increasing the speed of the air. However, as pointed out herein, there is a limit to the mass rate when the speed within the reactor is subsonic.

To illustrate these arguments, Kr. Birkeland is quoted here:

"... There is reason to believe, however, that this low cost of erection per Kilowatt will at some future time be further considerably reduced. From the experience, gained up to the present, it would appear that in larger works the furnaces should be made to take larger quantities of energy ... "

However, Birkeland did not succeed in increasing the power in that version of reactor, since in addition to the increase in the power, the mass rate would also have to be increased. That was impossible due to the reasons discovered herein.

Schönherr in his concept swirled the air in the reactor. In that manner, the turbulence was increased so he could achieve a much more stable arc, enabling him to increase the P·R of the arc and then to operate his process to produce higher mass production rates. The increase in turbulence in that reactor replaced the need of resistor ballast, or the need of magnetic field. That limit of the mass rate explains herein what the reasons were for applying many reactors in one plant in that early time.

Figure 5:
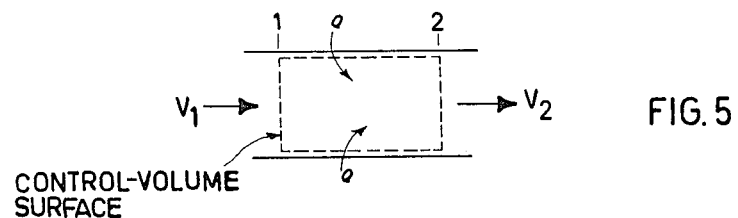
Figure 6:
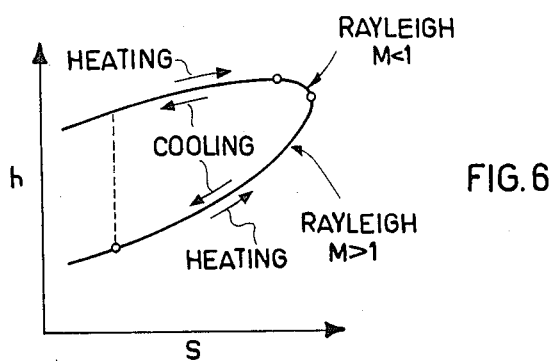

The phenomenon which causes that limit of the mass rate is known in the literature of gas dynamics as "Rayleigh Flow." This subject is related to a compressible flow with heat addition or energy exchange. Reference is made to FIGS. 5 and 6, which illustrate that in a subsonic flow in a chamber, where heat or electrical energy is added, the speed in the chamber is increased while the flow is subsonic in addition to increase in the entropy of the system. Maximum entropy is obtained at $M=1$. When the power added to the chamber is increased, the flow is "thermally choked"; that means that for power addition at subsonic speed, the amount of the power input cannot be greater than that for which the leaving Mach Number is unity. If the power addition is too great, the initial Mach Number will be reduced to a magnitude which is consistent with the specified amount of power input.

The sonic speed a (sonic speed) of the gas is equal to the square root of $\lambda \cdot R_g \cdot T$, while $R_g$ is gas constant of the gas and T is its temperature. The value of the velocity V is the product of Mach Number M, which is limited according to the above explanation, and the sonic speed also has an upper limit, since T also has an upper limit. These limits of M and a (sonic speed) result in an upper limit in V, which together with the limit of $\rho \cdot A$, results in an upper limit in the value of the mass rate $\dot{m}$.

The conclusion is that, in order to achieve a much higher mass rate, supersonic speed may be applied inside the reactor; by that, the speed V would be increased. Since for certain conditions of the flow, turbulence would also be increased, a much more stable arc is obtained which enables increase P·R of the discharge; that would produce an increase of $\rho \cdot A$, which together with the increase in V, results in a higher mass rate $\dot{m}$.

The above analysis shows that applying supersonic speed in arc chemical processes has an advantage of producing higher mass production rates in comparison to the case when subsonic speed is introduced in the reactor. This advantage, together with the previously-discussed advantages of increasing the energy efficiency of the process, makes the technique of the invention highly advantageous over the previously-described known techniques.

DESCRIPTION OF PREFERRED EMBODIMENTS

The preferred energy conversion system of the proposed system is a gas turbine. However, in certain cases a cascade of different types of energy conversion systems might be used, which includes a magnetohydrodynamic generator. Such matters are left to the designer and are related to an economical optimization analysis of the system according to the specific application involved.

The gas turbine extracts energy from the high stagnation enthalpy gaseous medium and converts it to mechanical energy which is used to drive an electric generator. It is preferred that it be used with high speed turbine wheels to reduce the relative Mach Number between the gas flow to the turbine blades; to prevent reheating of the mixture by shock waves and to inhibit decomposition of the desired formed compound. The severe turbine blade cooling problem can be surmounted by the use of either transpiration cooling or film cooling.

For some applications it may be found that the efficiency of the gas turbine is not enough for economically implementing the proposed process. For these cases, an MHD generator could be matched to first extract some of the energy of the exiting mixture from the reactor, while the remainder of the energy may be recovered by gas turbine directly and to heat up steam for driving steam turbine as well. When MHD generator is used, the quenching stage should be done carefully to the appropriate static temperature, to inhibit decomposition of the desired formed compound, but high enough to allow ionization of the gas or of the seed material which is used for increasing conductivity of gaseous medium which is essential for MHD application. In the case of nitric oxide production, this static temperature could be in the range of 1500° K.–2000° K. At this temperature the velocity of the exiting mixture from the reactor is very high.

Reference is now made to FIG. 1 of the accompanying drawings, which diagrammatically illustrates one form of apparatus constructed in accordance with the invention for producing nitric oxide by the plasma method from atmospheric nitrogen and oxygen. However, this apparatus could be used for other arc chemical processes as well. Briefly, the gas flow is accelerated before entering the reactor chamber to supersonic velocity, and the kinetic and heat energy of the mixture exiting from the reactor is converted first to mechanical work, and then to electrical energy. The conversion to mechanical work is effected by the use of turbine or multi-stage turbine driven by the kinetic energy of the mixture containing the nitrogen oxide, the apparatus also using the heat conducted through the walls of the reactor and of the quenching chamber.

Generally speaking, the apparatus would include the following five characteristics or conditions:

(a) The static temperature of the mixture in the reactor is the temperature at which sufficient nitric oxide concentration is obtained.

(b) The stagnation temperature of the mixture during heating by the arc should be as high as possible; to achieve that condition, the Mach number inside the reactor should be kept as high as possible.

(c) The mixture containing nitric oxide is expanded from the reactor to further increase Mach number to inhibit decomposition of nitrogen oxide.

(d) After expansion, the energy of the mixture is converted by turbines to mechanical work and then to electricity. Preferably, mechanical work would be produced by several stages turbines, the relative Mach number between the blades of the turbines and the flowing mixture being low to minimize shock waves and irreversibility.

(e) Irreversibility is minimized in all stages of the process; as much as irreversibility is minimized the efficiency of the Carnot cycle in producing mechanical work is increased.

With reference to FIG. 1, it will be seen that the apparatus diagrammatically illustrated includes a compressor 2 for introducing, under compression, the atmospheric air, or other mixture containing nitrogen and oxygen, into an inlet nozzle 4, the gas mixture being supplied by an inlet conduit 6. The inlet conduit 6 passes in heat-exchange relationship with respect to heat-exchangers 8 and 10 of the apparatus so as to pre-heat the gaseous mixture before being inletted via compressor 2.

Nozzle 4 is of the converging-diverging type, and includes a throat 12 and an outlet 14 through which the gaseous mixture exits at supersonic velocity. Throat 12 of the nozzle may constitute one electrode of the reactor, and the second electrode may be of annular configuration at the nozzle outlet end 14, as shown in FIG. 1 at 16. Alternatively, the first electrode may be located further downstream of the throat 12, so that the gaseous mixture will have reached a higher supersonic speed before the period of time it passes between the two electrodes producing the arc discharge.

It will thus be seen that the arc discharge occurs in the diverging nozzle 14, namely at the time the gaseous mixture is moving at supersonic speed between the two electrodes producing the arc discharge. Preferably, the throat 12 of the nozzle, particularly if it is serving as one of the electrodes, is conveniently removable from the apparatus so as to permit its convenient replacement because of extreme conditions of corrosion and wear occurring at this portion of the apparatus.

It will thus be seen that the electrical discharge produced between the two electrodes (16 and, e.g., throat 12) heats the gases in the inputted mixture, now travelling at supersonic velocity, so as to cause the molecules of the nitrogen and oxygen gases to react to produce nitric oxide. Since the arc chamber has a diverging nozzle shape while the speed of the flow within it is supersonic, "thermal choking" of the supersonic flow is avoided.

Downstream of the output electrode 16, the second nozzle includes a diverging portion 18 for expanding the gas mixture, diverging nozzle portion thereby further accelerating the mixutre and lowering its static temperature. This expansion of the mixture is done as rapidly as possible to inhibit the decomposition of the nitric oxide produced by the arc.

The gas mixture then passes through the chamber 20 which is in heat-exchange relationship with heat-exchanger 10 so as to pre-heat the gas mixture introduced via conduit 6, as mentioned above, and for possibly driving turbine 34.

The outlet end 22 of the chamber is caused to converge so as to decrease the Mach number of the mixture. The kinetic energy of the outputted mixture is converted to mechanical work by turbine, schematically shown at 24, before the mixture is outletted via outlet pipe 26. Turbines 24 are coupled via a coupling schematically shown at 28, to drive a generator 30 which converts the mechanical work to electrical energy.

In order to convert the heat energy within the gaseous mixture to mechanical energy, a further turbine 32 is provided driven by a fluid heated in heat-exchanger 8 at the inlet portion of the reactor, and a second turbine 34 is provided driven by a fluid heated in heat-exchanger 10 in heat-exchange relationship with chamber 20. Turbines 32 and 34 are coupled, via their respective transmissions 36, 38, to generator 30, so as to convert the mechanical work produced by the turbines to electrical energy.

The electrical power produced in generator 30 may be fed to the power supply 40 providing the power for driving, via line 42, the compressor 2, and for energizing, via line 44, the electrodes producing the arc within the reactor. The compressor 2 may be coupled directly to the turbine 24 by a shaft 23. Supplemental power is provided from an external source, via lines 46 and 48 to the power supply 40 and to the compressor 2, respectively.

During the passage of the gaseous mixture from chamber 20 to the outlet 26, the relative Mach number between the mixture and the blades of the turbine 24 should be as low as possible to prevent shock waves and irreversibility. The mixture containing the nitric oxides passing through outlet 26 is then further processed, according to known techniques, for producing the nitrogenous compounds.

In the arrangement illustrated in FIG. 1, the turbine or turbines 24 are disposed in the subsonic outlet end of the chamber 20, i.e., following the converging portion 22 wherein the supersonic speed of the gaseous mixture has been reduced to near sonic speed.

FIG. 2 illustrates a modification wherein the turbine, or multistage turbine, therein designated 124, is disposed to intercept the gaseous mixture while it still is travelling at supersonic speed, i.e., upstream of the converging portion 122 of the chamber 120.

The remainder of the apparatus disgrammatically illustrated in FIG. 2 is the same as described above with respect to FIG. 1, and therefore carries the same reference numerals but distinguished by a "prime" symbol; i.e., the compressor 2 in FIG. 1 is identified as 2' in FIG. 2.

FIG. 3 illustrates another embodiment of the invention which includes an MHD generator 130. The MHD generator is made of field coils 133, which produce a magnetic field in the direction of arrow 131. The magnetic field is applied to the ionized gaseous medium which flows in the direction of arrow 151. It may be introduced in the gas "seed" in order to increase the conductivity of the medium to improve the MHD operation. The seed material is introduced through inlet 149. The result of such a combination is that an EMF is induced in the direction of the encircled dot 145, i.e., out of the plane of the paper. Electrode 148 is the cathode of the MHD generator and could be made, for example, of graphite or silicon carbide. The current produced by the MHD generator is transmitted to the power supply 140 by line 141, and may be converted to A.C. by converter 139.

The remainder of the apparatus diagrammatically illustrated in FIG. 3 is the same as described above with respect to FIG. 1 and therefore carries the same reference numbers, except with a "double prime" symbol; thus, the compressor 2 in FIG. 1 is identified as 2" in FIG. 3.

While the invention has been described with respect to several specific embodiments, it will be appreciated that many variations, modifications and other applications of the invention may be made for production of other compounds from other gases.

What is claimed is:

1. A process for the formation of compounds from a gaseous medium by the plasma method, in which an electrical discharge is effected in a reactor into which the gaseous medium is fed such as to cause a chemical reaction, characterized in that the gas flow is at supersonic speed within said reactor, and at least part of the energy of the gaseous medium exiting from the reactor is converted into electrical energy.

2. The process according to claim 1, wherein the gaseous medium is introduced into the reactor at subsonic speed and is accelerated within the reactor to supersonic speed.

3. The process according to claim 1, wherein at least part of the energy of the gaseous medium exiting from the reactor is converted into mechanical energy.

4. The process according to claim 1, wherein said exiting gaseous medium is rapidly cooled by expansion from supersonic speed inside the reactor to a higher supersonic speed.

5. The process according to claim 1, wherein gaseous medium fed into the reactor includes a mixture of nitrogen gas and oxygen gas, and the formed compound is nitric oxides.

6. The process according to claim 5, wherein the gaseous medium fed into the reactor contains air.

7. The process according to claim 5, wherein the gaseous medium exiting from the reactor is accelerated substantially isentropically to increase the velocity outside of said reactor chamber.

8. The process according to claim 7, wherein the energy of the gaseous medium exiting from the reactor is substantially isentropically converted into electrical energy.

9. The process according to claim 5, wherein energy of the gaseous medium exiting from the reactor is converted into mechanical energy by a turbine located to intercept the gaseous medium exiting from the reactor after its velocity has been reduced to subsonic.

10. The process according to claim 5, wherein energy of the gaseous medium exiting from the reactor is converted into mechanical energy by a turbine located to intercept the gaseous medium exiting from the reactor while its velocity with respect to the turbine is still supersonic.

11. The process according to claim 1, wherein energy of the gaseous medium exiting from said reactor is converted into electrical energy by magnetohydrodynamic generator.

12. The process according to claim 1, wherein energy of the gaseous medium exiting from the reactor is used to heat steam which is used to drive steam turbines.

13. The process according to claim 1, wherein the discharge chamber has a divergent nozzle shaped to inhibit thermal choking of the supersonic flow during heating by the arc.

14. Apparatus for the formation of compounds from a gaseous medium by the plasma method, in which an electrical discharge is effected in a reactor through which the gaseous medium is fed such as to cause a chemical reaction, characterized in that said apparatus includes means for increasing the flow velocity of the gaseous medium to supersonic within said reactor; and means for converting at least a part of the energy of the gaseous medium exiting from the reactor into electrical energy.

15. The apparatus according to claim 14, wherein said means for increasing the flow velocity of the gaseous medium to supersonic includes a convergent-divergent nozzle disposed within or before said reactor.

16. The apparatus according to claim 14, further including means for cooling the exiting gaseous medium from the reactor to inhibit decomposition of the formed compounds.

17. The apparatus according to claim 14, wherein said means for converting energy from the gaseous medium exiting from the reactor comprises a turbine located to intercept the gaseous medium exiting from the reactor after the velocity of it has been reduced to subsonic.

18. The apparatus according to claim 14, wherein said means for converting energy of the gaseous medium exiting from the reactor comprises a turbine located to intercept the gaseous medium exiting from the reactor while the velocity of the gaseous medium is still supersonic.

19. The apparatus according to claim 14, wherein said means for converting energy of the gaseous medium exiting from the reactor comprises a magnetohydrodynamic generator converting such energy to electrical energy.

20. The apparatus according to claim 14, wherein the discharge chamber has a divergent nozzle shape to inhibit thermal choking of the supersonic flow during heating by the arc.

21. The apparatus according to claim 14, wherein the gaseous medium includes nitrogen gas and oxygen gas, and the formed compound is nitric oxides.

22. The apparatus according to claim 14, wherein energy of the gaseous medium heated by the electric discharge is used to heat steam which is used to drive a steam turbine.

* * * * *